United States Patent
Miyazaki

(10) Patent No.: US 12,252,122 B2
(45) Date of Patent: Mar. 18, 2025

(54) TRAVELING-SPEED CONTROL DEVICE AND VEHICLE EQUIPPED WITH THE SAME

(71) Applicant: TOYOTA JIDOSHA KABUSHIKI KAISHA, Toyota (JP)

(72) Inventor: Tsutomu Miyazaki, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 226 days.

(21) Appl. No.: 17/959,562

(22) Filed: Oct. 4, 2022

(65) Prior Publication Data

US 2023/0112121 A1 Apr. 13, 2023

(30) Foreign Application Priority Data

Oct. 7, 2021 (JP) .................................. 2021-165620

(51) Int. Cl.
*G06F 17/00* (2019.01)
*B60W 30/14* (2006.01)

(52) U.S. Cl.
CPC ....... *B60W 30/146* (2013.01); *B60W 2556/45* (2020.02)

(58) Field of Classification Search
CPC ........... B60W 30/146; B60W 2556/45; B60W 2556/10; B60W 2720/10
USPC ....................................................... 701/93
See application file for complete search history.

(56) References Cited

U.S. PATENT DOCUMENTS

| 8,700,299 B2* | 4/2014 | Morita ............. G08G 1/096716 |
| | | 701/123 |
| 12,017,662 B2* | 6/2024 | Miyazaki ............ B60W 40/105 |
| 2008/0258890 A1* | 10/2008 | Follmer ................. G08G 1/052 |
| | | 340/439 |
| 2013/0245945 A1* | 9/2013 | Morita ............... G08G 1/09675 |
| | | 701/533 |
| 2015/0106007 A1 | 4/2015 | Matsumura |
| 2019/0074833 A1* | 3/2019 | Sheng ................. G06F 3/04144 |
| 2022/0258741 A1* | 8/2022 | Miyazaki ........ B60W 30/18145 |

FOREIGN PATENT DOCUMENTS

| JP | 2009-149258 A | 7/2009 |
| JP | 2015-077863 A | 4/2015 |
| JP | 2018-096889 A | 6/2018 |

(Continued)

OTHER PUBLICATIONS

17959562_2021021275, Description_(Ttranslated),2021_02_12_01.pdf (Year: 2021).*

(Continued)

*Primary Examiner* — Ronnie M Mancho
(74) *Attorney, Agent, or Firm* — Dinsmore & Shohl LLP

(57) ABSTRACT

A traveling-speed control device restricts a traveling speed such that the traveling speed falls within an allowable range from a spot reference speed for a current spot, the spot reference speed being acquired from a spot reference speed storage area in which spot reference speeds at respective spots are stored, the spot reference speeds being set based on respective pieces of traveling speed data at the respective spots. Hereby, a vehicle can travel at a more appropriate traveling speed at each spot regardless of whether the each spot is on a road on map data or not.

5 Claims, 3 Drawing Sheets

(56) References Cited

FOREIGN PATENT DOCUMENTS

JP   2019-059361 A   4/2019
WO   2012/114382 A1   8/2012

OTHER PUBLICATIONS

17959562_2021021275, Drawings_(Translated),2021_02_12_02.pdf (Year: 2021).*
17959562_2021021275, Request_for_Examination_(Translated),2023-_03_23_03.pdf (Year: 2021).*
Reliability of Historical Car Data for Operating Speed Analysis along Road Networks (Year: 2022).*

\* cited by examiner

TRAVELING-SPEED CONTROL DEVICE AND VEHICLE EQUIPPED WITH THE SAME

CROSS-REFERENCE TO RELATED APPLICATION

This application claims priority to Japanese Patent Application No. 2021-165620 filed on Oct. 7, 2021, incorporated herein by reference in its entirety.

BACKGROUND

1. Technical Field

The present disclosure relates to a traveling-speed control device and a vehicle equipped with the traveling-speed control device.

2. Description of Related Art

In the related art, as this type of device, the following device is proposed (for example, see Japanese Unexamined Patent Application Publication No. 2009-149258 (JP 2009-149258 A)). That is, the device determines whether or not a current position on a vehicle is present on a road on map data, and when the device determines that the current position is not present on the road, the device performs a control such that a sudden start of the vehicle is prevented. This device performs the control, so that a sudden start or overrun of the vehicle is restrained without preventing an operation intended by a driver.

SUMMARY

However, in the abovementioned device, it is necessary to store a massive amount of data so as to store, in map data, pieces of information on all spots about whether each of the spots is present on a road or not. Further, there is such a spot where a certain degree of vehicle speed is required even when the spot is not present on a road. The spot is, for example, a driving passage inside a parking lot, and the like. Further, even in a case where the vehicle travels on a road where a regulation speed is determined, when the vehicle travels through an intersection with poor visibility, in the vicinity of a park, in a sharp turn, or the like, a driver might sensuously feel that the vehicle travels at an excessive speed even though the vehicle travels at a traveling speed lower than the regulation speed.

A main object of a traveling-speed control device and a vehicle including the traveling-speed control device in the present disclosure is to allow the vehicle to travel at a more appropriate speed at each spot regardless of whether the each spot is on a road on a map or not.

In order to achieve the main object, the traveling-speed control device and the vehicle equipped with the traveling-speed control device in the present disclosure employs the following approach.

A traveling-speed control device according to the present disclosure is a traveling-speed control device to be provided in a vehicle. The traveling-speed control device restricts a traveling speed such that the traveling speed falls within an allowable range from a spot reference speed for a current spot, the spot reference speed being acquired from a spot reference speed storage area in which spot reference speeds at respective spots are stored, the spot reference speeds being set based on respective pieces of traveling speed data at the respective spots.

The traveling-speed control device according to the present disclosure restricts a traveling speed such that the traveling speed falls within an allowable range from a spot reference speed for a current spot, the spot reference speed being acquired from a spot reference speed storage area in which spot reference speeds at respective spots are stored, the spot reference speeds being set based on respective pieces of traveling speed data at the respective spots. Hereby, regardless of whether or not a traveling spot is on a road on a map or not, a traveling speed at the traveling spot can be set to fall within an allowable range from a spot reference speed at the traveling spot, the spot reference speed being set based on traveling speed data at the traveling spot. As a result, the vehicle can travel at a more appropriate traveling speed at each spot.

In the traveling-speed control device according to the present disclosure, the spot reference speed storage area may be provided in a cloud server, and the traveling-speed control device may include a transmission portion configured to transmit a traveling spot and traveling speed data to the spot reference speed storage area when the vehicle travels at the traveling spot. Thus, traveling speed data of a host vehicle can be reflected on the spot reference speed.

In the traveling-speed control device according to the present disclosure, the spot reference speed storage area may be provided in the vehicle in which the traveling-speed control device is provided. A traveling spot and traveling speed data may be stored in the spot reference speed storage area when the vehicle travels at the traveling spot such that a spot reference speed for the traveling spot is set based on the traveling speed data at the traveling spot in a predetermined timing. In this configuration, the spot reference speeds at the respective spots are set based on past traveling speed data of the host vehicle. Accordingly, the spot reference speeds at the respective spots can be made suitable for the traveling state of a vehicle user.

In the traveling-speed control device according to the present disclosure, the spot reference speeds may be set such that a largest traveling speed among a plurality of pieces of traveling speed data at each of the respective spots is set as a spot reference speed at the each of the respective spots. This makes it possible to prevent the traveling speed from being excessively restricted.

In the traveling-speed control device according to the present disclosure, when a spot reference speed at a traveling spot is smaller than a spot reference speed at an adjacent spot within a predetermined range from the traveling spot, the traveling speed may be restricted such that the traveling speed falls within the allowable range from the spot reference speed at the adjacent spot. In this configuration, even when a current spot is misdetected as its adjacent spot or even when the vehicle travels at an intercrossing spot, a larger spot reference speed is used preferentially. Accordingly, it is possible to avoid excessive restriction on the traveling speed.

A vehicle according to the present disclosure is equipped with any of the above traveling-speed control device, that is, basically a traveling-speed control device to be provided in a vehicle, the traveling-speed control device being configured to restrict a traveling speed such that the traveling speed falls within an allowable range from a spot reference speed for a current spot, the spot reference speed being acquired from a spot reference speed storage area in which spot reference speeds at respective spots are stored, the spot reference speeds being set based on respective pieces of traveling speed data at the respective spots. Accordingly, the vehicle according to the present disclosure can yield the effect yielded by the traveling-speed control device according to the present disclosure. The effect is, for example, such an effect that, regardless of whether a traveling spot is on a road on a map or not, a traveling speed at the traveling spot can fall within an allowable range from a spot reference speed at the traveling spot, the spot reference speed being set based on traveling speed data at the traveling spot. That is, the vehicle according to the present disclosure can yield an effect that the vehicle can travel at a more appropriate traveling speed at each spot.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
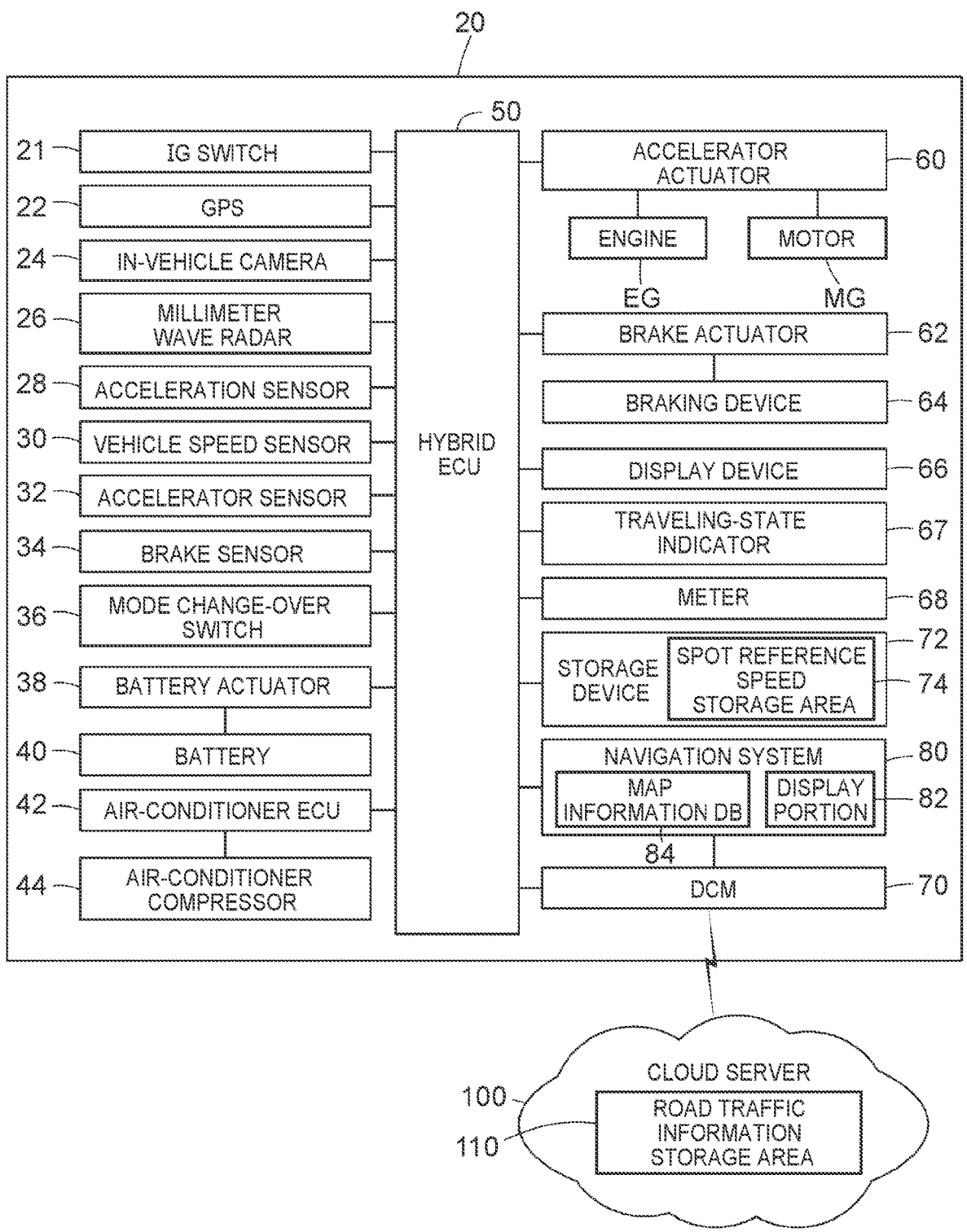
FIG. 1 is a block diagram illustrating one exemplary configuration of a hybrid electric vehicle 20 in one embodiment of the present disclosure in the form of blocks centered on a hybrid ECU 50.

Next will be described a mode for carrying out the disclosure with reference to an embodiment. FIG. 1 is a block diagram illustrating one exemplary configuration of a hybrid electric vehicle 20 equipped with a traveling-speed control device as one embodiment of the present disclosure in the form of blocks centered on a hybrid electronic control unit (hereinafter referred to as a hybrid ECU) 50. The hybrid ECU 50 corresponds to the traveling-speed control device. As illustrated herein, the hybrid electric vehicle 20 in the embodiment includes an engine EG and a motor MG as power sources. The hybrid electric vehicle 20 in the embodiment travels by switching between a charge depleting mode (CD mode) and a charge sustaining mode (CS mode) as a driving mode. The CD mode is a mode in which electric driving is performed preferentially to decrease the state of charge SOC of the battery 40. The CS mode is a mode in which electric driving and hybrid driving are performed together to maintain the state of charge SOC of the battery 40 at a target state. The electric driving is a mode in which the vehicle travels only by power from the motor MG in a state where the driving of the engine EG is stopped. The hybrid driving is a mode in which the engine EG is driven such that the vehicle travels by power from the engine EG and power from the motor MG.

In addition to the power sources, the hybrid electric vehicle 20 in the embodiment includes an ignition switch 21, a global positioning system or global positioning satellite (GPS) 22, an in-vehicle camera 24, a millimeter wave radar 26, an acceleration sensor 28, a vehicle speed sensor 30, an accelerator sensor 32, a brake sensor 34, a mode change-over switch 36, a battery actuator 38, a battery 40, an air-conditioner electronic control unit (hereinafter referred to as an air-conditioner ECU) 42, an air-conditioner compressor 44, the hybrid ECU 50, an accelerator actuator 60, a brake actuator 62, a braking device 64, a display device 66, a traveling-state indicator 67, a meter 68, a data communication module (DCM) 70, a storage device 72, a navigation system 80, and so on.

The GPS 22 is a device configured to detect the position of the vehicle based on signals transmitted from a plurality of GPS satellites. The in-vehicle camera 24 is a camera configured to capture an image around the vehicle. For example, a front camera configured to capture an image ahead of the vehicle, a rear camera configured to capture an image behind the vehicle, or the like corresponds to the in-vehicle camera 24. The millimeter wave radar 26 detects a vehicle-to-vehicle distance or a relative speed between a host vehicle and a vehicle ahead of the host vehicle or detects a vehicle-to-vehicle distance or a relative speed between the host vehicle and a vehicle behind the host vehicle.

The acceleration sensor 28 is a sensor configured to detect an acceleration of the vehicle in its front-rear direction of the vehicle or an acceleration of the vehicle in its right-left direction (lateral direction), for example. The vehicle speed sensor 30 detects the vehicle speed of the vehicle based on wheel speeds and the like. The accelerator sensor 32 detects an accelerator operation amount or the like corresponding to the stepping amount of an accelerator pedal by a driver. The brake sensor 34 detects a braking position or the like as the stepping amount of a brake pedal by the driver. The mode change-over switch 36 is a switch placed in the vicinity of a steering wheel in a driver seat and configured to switch between the CD mode and the CS mode.

The battery actuator 38 detects the state of the battery 40, e.g., a terminal-to-terminal voltage, a charge-discharge current, and a battery temperature, and manages the battery 40 based on them. The battery actuator 38 calculates the state of charge SOC as the ratio of a residual power storage capacity to a full power storage capacity based on the charge-discharge current, or the battery actuator 38 calculates allowable maximum output electric power (an output limit Wout) that may be output from the battery 40 or allowable maximum input electric power (an input limit Win) that may be input into the battery 40 based on the state of charge SOC, the battery temperature, and the like. The battery 40 is configured as a dischargeable and chargeable secondary battery, and a lithium ion battery, a nickel-metal hydride battery, a lead storage battery, and the like can be used, for example.

The air-conditioner ECU 42 is configured as a microcomputer mainly constituted by a CPU (not illustrated herein) and includes a ROM, a RAM, a flash memory, an input port, an output port, a communications port, and so on in addition to the CPU. The air-conditioner ECU 42 is incorporated into an air-conditioning device configured to perform air conditioning in a passenger cabin and performs a driving control on the air-conditioner compressor 44 in the air-conditioning device such that the temperature in the passenger cabin reaches a set temperature.

The engine EG is configured as an internal combustion engine, for example. The motor MG is configured as an electric machine also functioning as a generator such as a synchronous generator motor, for example. The motor MG is connected to the battery 40 via an inverter (not illustrated herein) and can output a driving force by use of electric power supplied from the battery 40 or charge the battery 40 by generated electric power.

The hybrid ECU 50 is configured as a microcomputer mainly constituted by a CPU (not illustrated herein) and includes a ROM, a RAM, a flash memory, an input port, an output port, a communications port, and so on in addition to the CPU. The hybrid ECU 50 sets a driving mode and sets a target driving point (a target rotation number or a target torque) of the engine EG and a torque command of the motor MG based on the driving mode thus set, the accelerator operation amount from the accelerator sensor 32, the braking position from the brake sensor 34, and the output limit and the input limit from the battery actuator 38.

At the time of electric driving, the hybrid ECU 50 sets a requested driving force or requested power based on the accelerator operation amount from the accelerator sensor 32 or the vehicle speed from the vehicle speed sensor 30, sets a torque command for the motor MG so that the requested driving force or requested power is output to the vehicle, and transmits the set torque command to the accelerator actuator 60. At the time of hybrid driving, the hybrid ECU 50 sets a target driving point for the engine EG and a torque command for the motor MG so that a requested driving force or requested power is output to the vehicle, and the hybrid ECU 50 transmits the target driving point and the torque command to the accelerator actuator 60. Further, when the brake pedal is stepped on, the hybrid ECU 50 sets a requested braking force based on the braking position from the brake sensor 34 or the vehicle speed from the vehicle speed sensor 30, sets a torque command for regeneration to perform a regenerative control on the motor MG based on the requested braking force or the vehicle speed, and also sets a target braking force by the braking device. Then, the hybrid ECU 50 transmits the torque command to the accelerator actuator 60 and transmits the target braking force to the brake actuator 62.

The accelerator actuator 60 performs a drive control on the engine EG or the motor MG based on the target driving point or the torque command set by the hybrid ECU 50. The accelerator actuator 60 performs an intake-air amount control, a fuel injection control, an ignition control, an intake-valve opening-closing timing control, and so on so that the engine EG is driven at the target driving point (the target rotation number or the target torque). Further, the accelerator actuator 60 performs a switching control on a switching element included in the inverter for driving the motor MG so that a torque corresponding to the torque command is output from the motor MG.

The brake actuator 62 controls the braking device 64 such that the target braking force set by the hybrid ECU 50 is applied to the vehicle by the braking device 64. The braking device 64 is configured as a hydraulic-driven friction brake, for example.

The display device 66 is incorporated in an installation panel in front of the driver seat, for example, and various pieces of information are displayed on the display device 66. The traveling-state indicator 67 includes an EV indicator and an HV indicator (not illustrated herein). At the time of motor driving, the EV indicator is turned on while the HV indicator is turned off. At the time of hybrid driving, the EV indicator is turned off while the HV indicator is turned on. The meter 68 is incorporated in the installation panel in front of the driver seat, for example.

The data communication module (DCM) 70 accesses a road traffic information storage area 110 provided in a cloud server 100 in which road traffic information from a road traffic information control center (not illustrated) is stored, and the data communication module 70 transmits information of the host vehicle to a storage area of the cloud server 100 or receives road traffic information on a region around the host vehicle from the road traffic information storage area 110 of the cloud server 100. The information on the host vehicle can include, for example, a position, a vehicle speed, driving power, a driving mode, and the like of the host vehicle. The road traffic information can include, for example, information on current or future traffic jam, information on a current average vehicle speed or a predicted value of a future average vehicle speed in a zone on a travel route, information on a traffic regulation, information on weather, information on a road-surface condition, information on a map, and the like.

The storage device 72 is constituted by a hard disk or the like and is provided with a spot reference speed storage area 74. Note that the storage device 72 is provided with various storage areas other than the spot reference speed storage area 74.

The navigation system 80 is a system configured to guide to the host vehicle to a set destination and includes a display portion 82 and a map information database 84. The navigation system 80 acquires road traffic information on a region around the host vehicle from the road traffic information storage area 110 provided in the cloud server 100 via the data communication module (DCM) 70 and performs a route guide.

Figure 2:
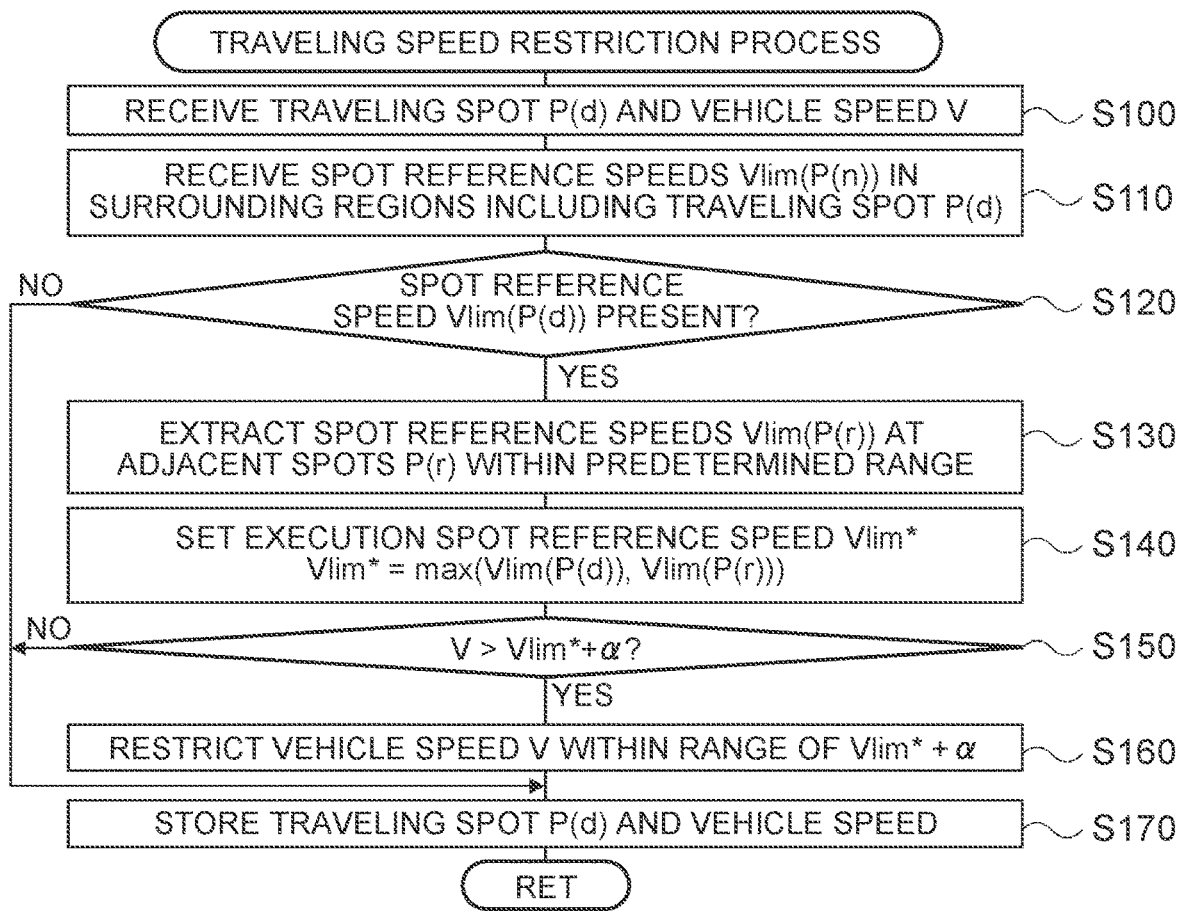
FIG. 2 is a flowchart illustrating one example of a traveling speed restriction process to be executed by the hybrid ECU 50.

Next will be described the operation of the hybrid electric vehicle 20 in the embodiment that is configured as described above, more particularly an operation at the time when a traveling speed is restricted by use of a spot reference speed. FIG. 2 is a flowchart illustrating one example of a traveling speed restriction process to be executed by the hybrid ECU 50 of the hybrid electric vehicle 20 in the embodiment. The traveling speed restriction process is executed repeatedly during traveling.

Figure 3:
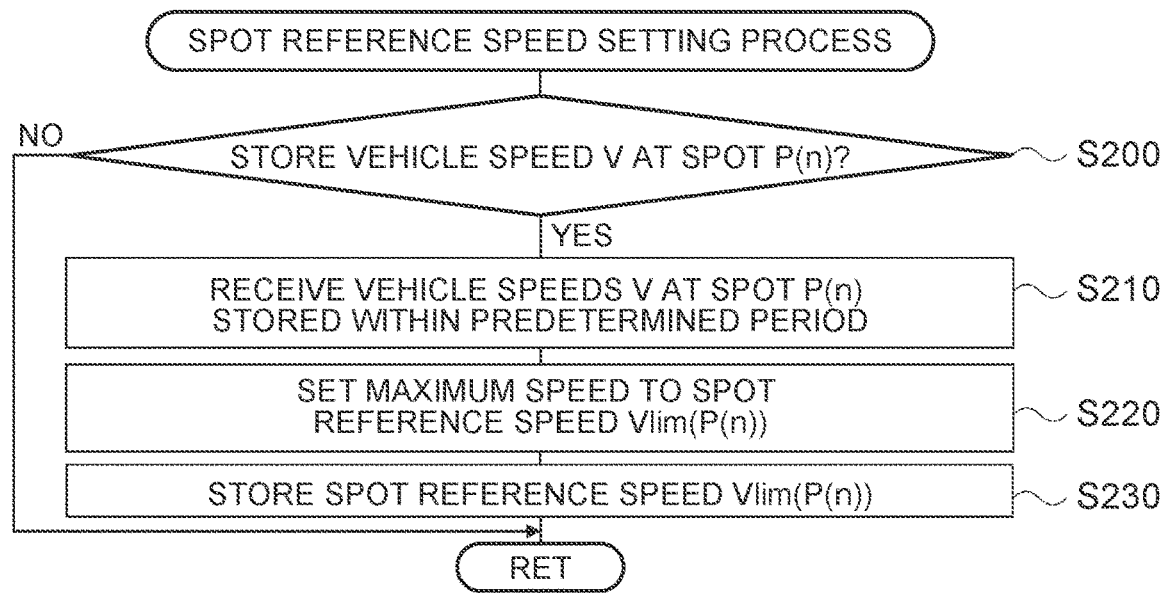
FIG. 3 is a flowchart illustrating one example of a spot reference speed setting process to be executed by the hybrid ECU 50.

When the traveling speed restriction process is executed, the hybrid ECU 50 first receives a current traveling spot P(d) detected by the GPS 22 and a vehicle speed V detected by the vehicle speed sensor 30 (step S100). Subsequently, the hybrid ECU 50 receives spot reference speeds Vlim(P(n)) in a surround region including the traveling spot P(d) from the spot reference speed storage area 74 of the storage device 72 (step S110) and determines whether a spot reference speed Vlim(P(d)) for the traveling spot P(d) is present or not (step S120). A spot reference speed Vlim(P(n)) is set such that a spot P(d) and a vehicle speed V at the time of past traveling at the spot P(d) are stored, and a spot reference speed setting process illustrated in FIG. 3 (described later) is performed. Accordingly, for a spot where the hybrid electric vehicle 20 has traveled in the past, the spot reference speed Vlim(P(n)) is set. In the meantime, for a spot where the hybrid electric vehicle 20 has not traveled in the past, no spot reference speed Vlim(P(n)) is set. In a case where the hybrid ECU 50 determines that the spot reference speed Vlim(P(d)) for the traveling spot P(d) is not present, the hybrid ECU 50 stores the current traveling spot P(d) and the vehicle speed V in the spot reference speed storage area 74 of the storage device 72 (step S170) and ends this process. When the traveling spot P(d) and the vehicle speed V are stored, the spot reference speed setting process illustrated in FIG. 3 is executed, so that the spot reference speed Vlim(P(d)) is set for the traveling spot P(d). The setting process of the spot reference speed Vlim(P(n)) will be described later.

In a case where the hybrid ECU 50 determines, in step S120, that the spot reference speed Vlim(P(d)) for the traveling spot P(d) is present, the hybrid ECU 50 extracts spot reference speeds Vlim(P(r)) at adjacent spots P(r) within a predetermined range (step S130), and the hybrid ECU 50 sets, as an execution spot reference speed Vlim*, as a largest value among the spot reference speed Vlim(P(d)) at the traveling spot P(d) and the extracted spot reference speeds Vlim(P(r)) (step S140). Here, the predetermined range is a range that covers a detection error of the traveling spot P(d) by the GPS 22, and three meters, five meters, or the like can be used, for example. The reason why the largest value among the spot reference speed Vlim(P(d)) at the traveling spot P(d) and the spot reference speeds Vlim(P(r)) at the adjacent spots P(r) within the predetermined range is set as the execution spot reference speed Vlim* is to restrain the traveling speed from being restricted excessively due to a detection error of the traveling spot P(d) by the GPS 22.

When the execution spot reference speed Vlim* is set as such, the hybrid ECU 50 determines whether or not the vehicle speed V is larger than a value obtained by adding a margin value α to the execution spot reference speed Vlim* (step S150). As the margin value α, a value of around 10% or 20% of the execution spot reference speed Vlim* within a range of 10 km/h can be used, for example. That is, the margin value α is set within a range that does not make a past traveling speed at the traveling spot P(d) excessively large. When the vehicle speed V is larger than the value obtained by adding the margin value α to the execution spot reference speed Vlim*, the engine EG or the motor MG is controlled by the accelerator actuator 60 or the braking device 64 is controlled by the brake actuator 62 so that the vehicle speed V reaches the value obtained by adding the margin value α to the execution spot reference speed Vlim* (step S160). Then, the hybrid ECU 50 stores the current traveling spot P(d) and a controlled vehicle speed V in the spot reference speed storage area 74 of the storage device 72 (step S170) and ends this process.

When the hybrid ECU 50 determines, in step S150, that the vehicle speed V is equal to or less than the value obtained by adding the margin value α to the execution spot reference speed Vlim*, the hybrid ECU 50 stores the current traveling spot P(d) and the vehicle speed V in the spot reference speed storage area 74 of the storage device 72 (step S170) and ends this process.

Next will be described the spot reference speed setting process illustrated in FIG. 3. This process is executed when the traveling spot P(d) and the vehicle speed V are stored. When the spot reference speed setting process is executed, the hybrid ECU 50 first determines whether or not the traveling spot P(d) and the vehicle speed V are stored in the spot reference speed storage area 74 of the storage device 72 (step S200). When the hybrid ECU 50 determines that the traveling spot P(d) and the vehicle speed V are not stored in the spot reference speed storage area 74 of the storage device 72, the hybrid ECU 50 ends this process.

When the hybrid ECU 50 determines, in step S200, that the traveling spot P(d) and the vehicle speed V are stored in the spot reference speed storage area 74 of the storage device 72, the hybrid ECU 50 receives vehicle speeds V at the traveling spot P(d) that have been stored within a predetermined period from the spot reference speed storage area 74 of the storage device 72 (step S210). The hybrid ECU 50 sets a largest vehicle speed V among them as a spot reference speed Vlim(P(d)) at the traveling spot P(d) (step S220), and the hybrid ECU 50 stores the spot reference speed Vlim(P (d)) thus set in the spot reference speed storage area 74 of the storage device 72 (step S230). Then, the hybrid ECU 50 ends this process.

Figure 4:
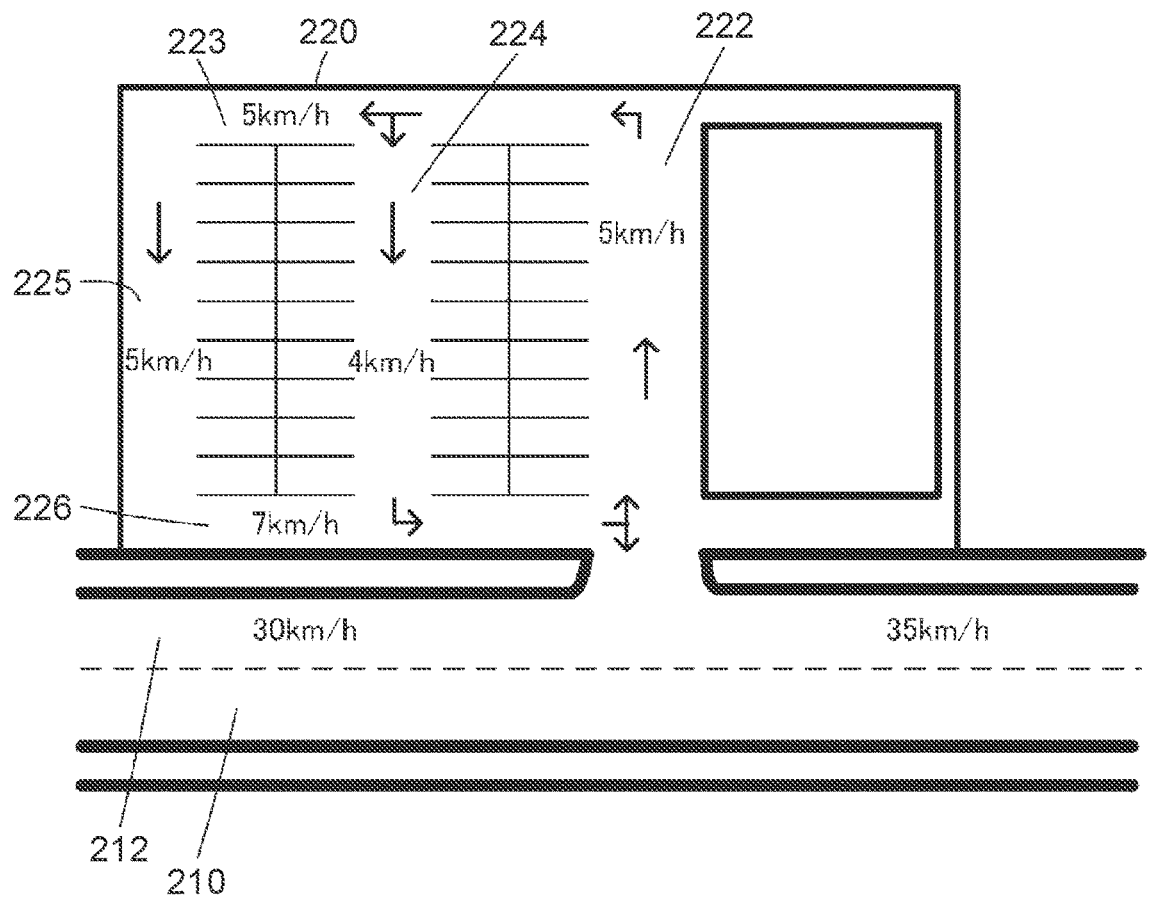
FIG. 4 is an explanatory view illustrating examples of spot reference speeds Vlim in a road 210 and a parking lot 220 along the road 210.

FIG. 4 is an explanatory view illustrating examples of spot reference speeds Vlim in a road 210 and in a parking lot 220 along the road 210. In the figure, speeds illustrated herein indicate the spot reference speeds Vlim. In a traffic zone 212 of the road 210, the spot reference speed Vlim is set to 30 km/h, in a passage 222 in the parking lot 220 as an entrance from the road 210, the spot reference speed Vlim is set to 5 km/h, in a passage 223 farthest from the road 210 in the parking lot 220, the spot reference speed Vlim is set to 5 km/h, in a passage 224 in the center of the parking lot 220, the spot reference speed Vlim is set to 4 km/h, in a passage 225 on the leftmost side in the parking lot 220, the spot reference speed Vlim is set to 5 km/h, and in a passage 226 in the parking lot 220 in the vicinity of the traffic zone 212 of the road 210, the spot reference speed Vlim is set to 7 km/h. In each of the traffic zone 212 of the road 210 and the passages 222 to 225 in the parking lot 220, the vehicle speed V is restricted to a value obtained by adding the margin value α to the spot reference speed Vlim set in the each the traffic zone 212 of the road 210 and the passages 222 to 225 in the parking lot 220. In the passage 226 in the parking lot 220 in the vicinity of the traffic zone 212 of the road 210, the spot reference speed Vlim is 7 km/h. However, when 30 km/h set in the traffic zone 212 is extracted as a spot reference speed Vlim within a predetermined range from the passage 226, the vehicle speed V is restricted to a value obtained by adding the margin value α to 30 km/h that is a larger speed, in preparation for an error to occur in the determination on whether the vehicle travels in the passage 226 or in the traffic zone 212 due to a detection error of the traveling spot P(d) by the GPS 22.

In the hybrid electric vehicle 20 of the embodiment described above, a spot reference speed VlimP(d) at a spot P(d) is set and stored based on the spot P(d) and a vehicle speed V at the time when the hybrid electric vehicle 20 has traveled at the spot P(d) in the past. When the hybrid electric vehicle 20 travels at the spot P(d), the hybrid electric vehicle 20 receives the spot reference speed VlimP(d) thus stored, so that the vehicle speed V is restricted to a value obtained by adding the margin value α to the spot reference speed Vlim(P(d)). Hereby, the hybrid electric vehicle 20 can travel at a more appropriate traveling speed at each spot P(n) regardless of whether the each spot P(n) is on a road on map data or not. Besides, the vehicle speed V is restricted to the value obtained by adding the margin value α to the spot reference speed Vlim(P(d)). Accordingly, it is possible to prevent such a situation that the traveling speed is restricted excessively. Further, since the largest vehicle speed V among past vehicle speeds V at the spot P(d) is set as the spot reference speed VlimP(d)), it is possible to prevent such a situation that the traveling speed is restricted excessively.

Figure 5:
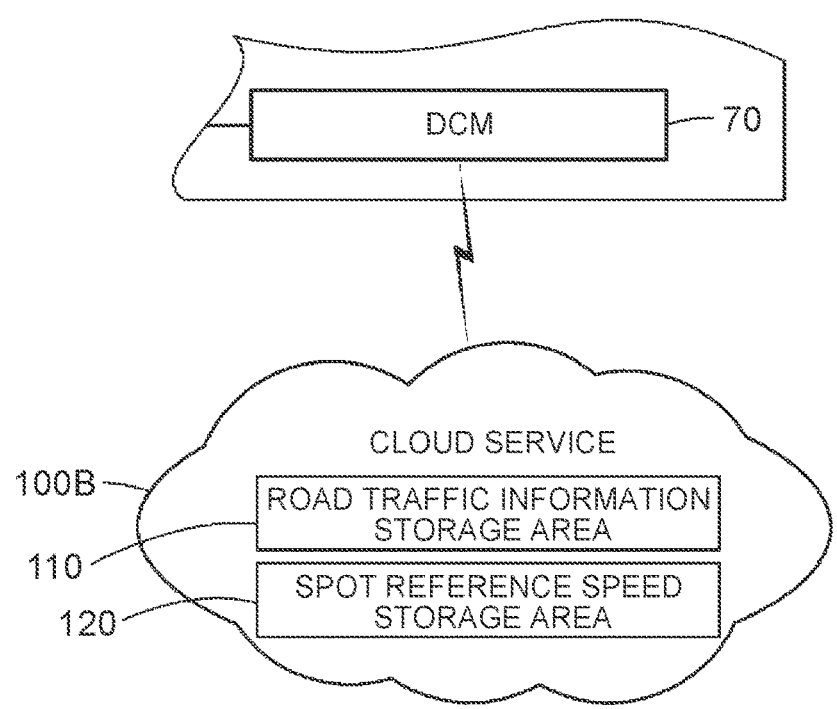
FIG. 5 is an explanatory view illustrating one example of a cloud server 100B of a modification.

In the hybrid electric vehicle 20 of the embodiment, a spot reference speed VlimP(d) at a spot P(d) is set and stored based on the spot P(d) and a vehicle speed V at the time when the hybrid electric vehicle 20 has traveled at the spot P(d) in the past. When the hybrid electric vehicle 20 travels at the spot P(d), the hybrid electric vehicle 20 receives the spot reference speed VlimP(d) thus stored, so that the vehicle speed V is restricted to a value obtained by adding the margin value α to the spot reference speed Vlim(P(d)). However, as illustrated in a modification in FIG. 5, the spot reference speed Vlim(P(d)) at the spot P(d) may be stored in a spot reference speed storage area 120 provided in a cloud server 100B, and when the hybrid electric vehicle 20 travels at the spot P(d), the hybrid electric vehicle 20 may acquire the spot reference speed Vlim(P(d)) corresponding to the spot P(d) from the spot reference speed storage area 120 provided in the cloud server 100B, so that the vehicle speed V is restricted to a value obtained by adding the margin value α to the spot reference speed Vlim(P(d)). In this case, the spot reference speed Vlim(P(d)) at the spot P(d) can be set based on vehicle speeds V at the spot P(d) that are received from a plurality of vehicles. Accordingly, even at a spot where the hybrid electric vehicle 20 has not traveled in the past, the hybrid electric vehicle 20 can restrict its traveling speed by the spot reference speed Vlim.

In the hybrid electric vehicle 20 of the embodiment, the vehicle speed V is restricted to the value obtained by adding the margin value α to the spot reference speed Vlim(P(d)), but the vehicle speed V may be restricted by the spot reference speed Vlim(P(d)).

In the hybrid electric vehicle 20 of the embodiment, the largest vehicle speed V among the vehicle speeds V at the traveling spot P(d) that have been stored in the spot reference speed storage area 74 of the storage device 72 within a predetermined period is set as the spot reference speed Vlim(P(d)) at the spot P(d). However, the second largest vehicle speed V may be set as the spot reference speed Vlim(P(d)) at the spot P(d) or an average vehicle speed V may be set as the spot reference speed Vlim(P(d)) at the spot P(d).

In the embodiment, the traveling-speed control device is provided in the hybrid electric vehicle 20. However, the traveling-speed control device should be provided in an automobile that can perform a speed control. Accordingly, the traveling-speed control device may be provided in a battery electric vehicle or a fuel cell electric vehicle that does not include the engine EG or may be provided in an automobile that does not include a drive motor.

Note that the correspondence between the main elements of the embodiment and the main elements of the disclosure described in the field of SUMMARY is one example for the embodiment to specifically describe a form to carry out the disclosure described in the field of SUMMARY, and therefore, the correspondence does not limit the elements of the disclosure described in the field of SUMMARY That is, the disclosure described in the field of SUMMARY should be interpreted based on the description of the field, and the embodiment is just a concrete example of the disclosure described in the field of SUMMARY.

The mode for carrying out the present disclosure has been described above with reference to the embodiment. However, the present disclosure is not limited to such an embodiment at all, and it is needless to say that the present disclosure can be carried out in various forms within a range that does not deviate from the gist of the present disclosure.

The present disclosure is usable in manufacture industries of a traveling-speed control device and an automobile equipped with the traveling-speed control device.

What is claimed is:

1. A traveling-speed control device in a vehicle, comprising:
an electronic control unit, wherein the electronic control unit restricts a traveling speed such that the traveling speed falls within an allowable range from a spot reference speed for a current spot, the spot reference speed being acquired from a spot reference speed storage area in which spot reference speeds at respective spots are stored, the spot reference speeds being set based on respective pieces of traveling speed data at the respective spots, wherein
the spot reference speeds are set such that a largest traveling speed among a plurality of pieces of traveling speed data at each of the respective spots is set as the spot reference speed at the each of the respective spots,
the electronic control unit determines the spot reference speeds at adjacent spots within a predetermined distance range that covers a detection error of a traveling spot, and
the electronic control unit determines whether or not a vehicle speed is larger than a value obtained by adding a margin value to an execution spot reference speed, the margin value comprising a predetermined value of the execution spot reference speed within a predetermined speed range, the execution spot reference speed being the largest value among the spot reference speed at the traveling spot and the determined spot reference speeds.

2. The traveling-speed control device according to claim 1, wherein:
the spot reference speed storage area is provided in a cloud server; and
the traveling-speed control device further comprises a transmission portion configured to transmit the traveling spot and traveling speed data to the spot reference speed storage area when the vehicle travels at the traveling spot.

3. The traveling-speed control device according to claim 1, wherein:
the spot reference speed storage area is provided in the vehicle;
the traveling spot and traveling speed data are stored in the spot reference speed storage area when the vehicle travels at the traveling spot such that the spot reference speed for the traveling spot is set based on the traveling speed data at the traveling spot in a predetermined timing.

4. The traveling-speed control device according to claim 1, wherein, when the spot reference speed at the traveling spot is smaller than a first spot reference speed at a first adjacent spot within the predetermined distance range from the traveling spot, the traveling speed is restricted such that the traveling speed falls within the allowable range from the spot reference speed at the first adjacent spot.

5. A vehicle equipped with the traveling-speed control device according to claim 1.

* * * * *